US010947396B2

(12) United States Patent
Qiu et al.

(10) Patent No.: US 10,947,396 B2
(45) Date of Patent: Mar. 16, 2021

(54) CURABLE ANTIFOULING COMPOSITION, METHOD OF USE, AND ARTICLES

(71) Applicant: 3M INNOVATIVE PROPERTIES COMPANY, St. Paul, MN (US)

(72) Inventors: Zai-Ming Qiu, Woodbury, MN (US); Alexander J. Kugel, Woodbury, MN (US); Michael J. Svarovsky, Granger, IN (US)

(73) Assignee: 3M Innovative Properties Company, St. Paul, MN (US)

( * ) Notice: Subject to any disclaimer, the term of this patent is extended or adjusted under 35 U.S.C. 154(b) by 496 days.

(21) Appl. No.: 14/442,340

(22) PCT Filed: Nov. 8, 2013

(86) PCT No.: PCT/US2013/069180
§ 371 (c)(1),
(2) Date: May 12, 2015

(87) PCT Pub. No.: WO2014/078195
PCT Pub. Date: May 22, 2014

(65) Prior Publication Data
US 2016/0312040 A1 Oct. 27, 2016

Related U.S. Application Data (60) Provisional application No. 61/725,843, filed on Nov. 13, 2012.

(51) Int. Cl.
| | |
|---|---|
| C09D 5/16 | (2006.01) |
| C09D 133/16 | (2006.01) |
| C09D 143/04 | (2006.01) |
| C08K 5/00 | (2006.01) |
| C08F 220/24 | (2006.01) |
| C09D 133/26 | (2006.01) |
| C08F 220/28 | (2006.01) |
| C08F 220/36 | (2006.01) |
| C08F 230/08 | (2006.01) |
| C09D 133/14 | (2006.01) |

(52) U.S. Cl.
CPC .......... *C09D 5/1668* (2013.01); *C08F 220/24* (2013.01); *C08F 220/28* (2013.01); *C08F 220/36* (2013.01); *C08F 230/08* (2013.01); *C08K 5/0025* (2013.01); *C09D 5/165* (2013.01); *C09D 5/1687* (2013.01); *C09D 133/14* (2013.01); *C09D 133/16* (2013.01); *C09D 133/26* (2013.01); *C09D 143/04* (2013.01); *C08F 220/286* (2020.02); *C08F 220/365* (2020.02)

(58) Field of Classification Search
CPC .. C09D 5/1668; C09D 133/16; C09D 143/04; C08K 5/0025
See application file for complete search history.

(56) References Cited

U.S. PATENT DOCUMENTS

| | | |
|---|---|---|
| 3,544,537 A | 12/1970 | Brace |
| 3,553,179 A | 1/1971 | Bartlett |
| 4,751,138 A | 6/1988 | Tumey |
| 4,985,340 A | 1/1991 | Palazzotto |
| 5,717,125 A | 2/1998 | Wolter |
| 5,723,516 A | 3/1998 | Bigham |
| 6,204,350 B1 | 3/2001 | Liu |
| 6,758,389 B1 | 7/2004 | Odaka |
| 7,196,212 B2 | 3/2007 | Yamaguchi |
| 7,652,115 B2 | 1/2010 | Dams |
| 2004/0077775 A1 | 4/2004 | Audenaert |
| 2009/0198000 A1 | 8/2009 | Weinelt |
| 2010/0310875 A1 | 12/2010 | Hao |
| 2011/0027702 A1* | 2/2011 | Qiu .......................... G03F 7/11 430/5 |
| 2011/0311826 A1 | 12/2011 | Qiu |
| 2015/0175813 A1 | 6/2015 | Qiu |

FOREIGN PATENT DOCUMENTS

| | | |
|---|---|---|
| CN | 1138345 A | 12/1996 |
| CN | 1220673 A | 6/1999 |
| CN | 102597116 A | 7/2012 |
| EP | 0109851 | 5/1984 |
| EP | 0306161 | 3/1989 |
| EP | 0306162 | 3/1989 |
| EP | 0337474 | 10/1989 |
| JP | H11-263936 | 9/1999 |
| JP | 2000-017028 A | 1/2000 |
| JP | 2001-135926 A | 5/2001 |
| JP | 2008-249867 A | 10/2008 |
| JP | 2011-089052 | 5/2011 |
| KR | 2009-0054496 | 6/2009 |

(Continued)

OTHER PUBLICATIONS

Han Jing et al., The Synthesis Development of UV-curable Fluorinated Polymer, Polymer Bulletin, Issue 2, 2007, pp. 48-56.
Nie Jun et al., Progress in Cationic UV-Curing, Coatings Technology & Abstracts, Issue 10, pp. 1-4 and 9.
Libo Nie et al., UV cationic curing and Research Progress, Fine and Specialty Chemicals, No. 21, 2001, 8 pages.
Callow, "Marine biofouling: a sticky problem", Biologist, 2002, vol. 49, No. 1, pp. 10-14.
Castner, "Biomedical surface science: Foundations to frontiers," Surface science, 2002, vol. 500, pp. 28-60.

(Continued)

*Primary Examiner* — Andrew S Rosenthal
(74) *Attorney, Agent, or Firm* — Bradford B. Wright (57) ABSTRACT

Curable antifouling compositions include fluorinated polymers that contain a perfluoropolyether group, a poly(alkyleneoxide) group, a hydrolyzable silane group and a cationic curative. The curable antifouling compositions can be applied on a surface of a substrate, and at least partially cured to provide an article with antifouling properties.

15 Claims, 1 Drawing Sheet

(56) References Cited

FOREIGN PATENT DOCUMENTS

| WO | WO 97-00230 | 1/1997 | |
|---|---|---|---|
| WO | WO 2007-102741 | 9/2007 | |
| WO | WO 2008102256 A1 | 8/2008 | |
| WO | WO 2009-076389 | 6/2009 | |
| WO | WO 2010-080288 | 7/2010 | |
| WO | WO-2010080288 A2 * | 7/2010 | ............ C08F 265/04 |
| WO | WO 2010080288 A2 * | 7/2010 | ............ C08F 220/24 |
| WO | WO 2014-018266 | 1/2014 | |

OTHER PUBLICATIONS

Choong, "Catheter associated urinary tract infection and encrustation," International Journal of Antimicrobial Agent, 2001, vol. 17, pp. 305-310.

Costerton, "Bacterial Biofilms: A Common Cause of Persistent Infections," Science, 1999, vol. 284, pp. 1318-1322.

Costerton, "How Bacteria Stick," Scientific American, 1978, vol. 238, pp. 86-95.

Costerton, "Microbial Biofilms," Annual Review of Microbiol, 1995, vol. 49, pp. 711-745.

Costerton, "The application of biofilm science to the study and control of chronic bacterial infections," The Journal of Clinical Investigation, Nov. 2003, vol. 112, No. 10, pp. 1466-1477.

Fux, "Survival strategies of infectious biofilms," Trends in Microbiology, vol. 13, No. 1, Jan. 2005, pp. 13-34.

Stickler, "Bacterial biofilms in patients with indwelling urinary catheters," Nature Clinical Practice, Urology, 2008, vol. 5, No. 11, pp. 598-608.

Stoodley, "Bacterial biofilms: From the Natural Environment to Infectious Diseases," Nature Reviews, Microbiology, 2004, vol. 2, No. 95, pp. 95-108.

Tirrell, "The role of surface science in bioengineered materials," Surface Science, 2002, vol. 500, pp. 61-83.

Yebra, "Antifouling technology-past, present and future steps towards efficient and environmentally friendly antifouling coating," Progress in Organic Coatings, 2004, vol. 50, pp. 75-104.

International Search Report for PCT International Application No. PCT/US2013/069180, dated Mar. 6, 2014, 4pgs.

* cited by examiner

CURABLE ANTIFOULING COMPOSITION, METHOD OF USE, AND ARTICLES

TECHNICAL FIELD

The present disclosure broadly relates to compositions useful for inhibiting biofouling.

BACKGROUND

The term "biofouling" refers to the attachment of organisms to surfaces of objects. Biofouling typically occurs where water-based liquids are in contact with other materials. Biofouling is ubiquitous, but is most significant economically to the shipping industries, since high levels of biofouling on a ship's hull significantly increases drag and increases fuel consumption. Industrially important impacts of biofouling include: maintenance of mariculture, membrane systems (e.g., membrane bioreactors and reverse osmosis spiral wound membranes), and cooling water cycles of large industrial equipments and power stations. Biofouling can occur in oil pipelines carrying oils with entrained water especially those carrying used oils, cutting oils, oils rendered water-soluble through emulsification, and/or hydraulic oils.

Other things impacted by biofouling include marine surfaces, medical surfaces, household surfaces, microelectrochemical drug delivery devices, papermaking and pulp industry machines, underwater instruments, fire protection system piping, and sprinkler system nozzles.

In the clinical area, biofouling in the form of biofilm formation is believed to have a significant role in catheter associated urinary tract infections (CAUTI) and ventilator associated pneumonia (VAP). CAUTIs comprise the largest percentage of hospital acquired infections (HAIs) and are the second most common cause of nosocomial bloodstream infections.

In groundwater wells, biofouling build-up can limit recovery flow rates, as is the case in the exterior and interior of ocean-laying pipes where fouling is often removed with a tube cleaning process.

SUMMARY

In one aspect, the present disclosure provides a curable antifouling composition comprising components:

a) at least one fluorinated polymer, wherein each said at least one fluorinated polymer independently comprises:
at least one divalent group A represented by the formula wherein $R^1$ independently represents H or methyl, X independently represents a covalent bond or a divalent organic linking group, $L^1$ independently represents a covalent bond or a divalent organic linking group, and $R_{fl}$ independently represents a monovalent perflourinated organic group;
at least one divalent group B represented by the formula wherein $L^2$ independently represents a covalent bond or divalent organic linking group, k represents an integer in the range of from 1 to 4, $R^2$ independently represents H or an alkyl group having from 1 to 18 carbon atoms, and f independently represents an integer in the range of from 3 to 200, inclusive;
at least one divalent group C represented by the formula wherein $L^3$ independently represents a covalent bond or a divalent organic linking group, and each $Y^1$, $Y^2$, and $Y^3$ independently represents a hydrolyzable group or a hydrocarbyl group having from 1 to 10 carbon atoms, with the proviso that at least one of $Y^1$, $Y^2$, and $Y^3$ is a hydrolyzable group; and b) cationic curative.

In another aspect, the present disclosure provides a method of using a curable antifouling composition, the method comprising:

applying a curable antifouling composition to at least a portion of a surface of a substrate, wherein the substrate is selected from the group consisting of marine vessel hulls, anchors, piers, docks, caissons, invasive medical devices, non-invasive medical devices, handrails, door knobs, countertops, membrane support frames, heat exchangers, microelectrochemical drug delivery devices, papermaking machines, tanks for holding liquid, water pipes, plumbing fixtures, and mariculture apparatuses; and at least partially curing the curable antifouling composition, wherein the curable antifouling composition comprises components:

a) at least one fluorinated polymer, wherein each said at least one fluorinated polymer independently comprises:
at least one divalent group A represented by the formula wherein $R^1$ independently represents H or methyl, X independently represents a covalent bond or a divalent organic linking group, $L^1$ independently represents a covalent bond or a divalent organic linking group, and $R_{fl}$ independently represents a monovalent perflourinated organic group;
at least one divalent group B represented by the formula wherein $L^2$ independently represents a covalent bond or divalent organic linking group, k represents an integer in the range of from 1 to 4, $R^2$ independently represents H of an alkyl group having from 1 to 18 carbon atoms, and f independently represents an integer in the range of from 3 to 200, inclusive;

at least one divalent group C represented by the formula wherein L³ independently represents a covalent bond or a divalent organic linking group, and wherein each Y¹, Y², and Y³ independently represents a hydrolyzable group or an alkyl group having from 1 to 7 carbon atoms, with the proviso that at least one of Y¹, Y², and Y³ is a hydrolyzable group; and b) cationic curative.

Antifouling compositions according to the present disclosure, applied to a surface of a substrate and sufficiently cured, provide articles with antifouling properties.

Accordingly, in another aspect, the present disclosure provides an article comprising a substrate having a surface, wherein at least a portion of the surface has an antifouling coating thereon, wherein the substrate is selected from the group consisting of marine vessel hulls, anchors, piers, docks, caissons, invasive medical devices, non-invasive medical devices, handrails, door knobs, countertops, membrane support frames, heat exchangers, microelectrochemical drug delivery devices, papermaking machines, tanks for holding liquid, water pipes, plumbing fixtures, and mariculture apparatuses, wherein the antifouling coating comprises an at least partially cured curable antifouling composition, and wherein the curable antifouling composition comprises components:

a) at least one fluorinated polymer, wherein each said at least one fluorinated polymer independently comprises:

at least one divalent group A represented by the formula wherein R¹ independently represents H or methyl, X independently represents a covalent bond or a divalent organic linking group, L¹ independently represents a covalent bond or a divalent organic linking group, and $R_f$ independently represents a monovalent perflourinated organic group;

at least one divalent group B represented by the formula wherein L² independently represents a covalent bond or divalent organic linking group, k represents an integer in the range of from 1 to 4, R² independently represents H of an alkyl group having from 1 to 18 carbon atoms, and f independently represents an integer in the range of from 3 to 200, inclusive;

at least one divalent group C represented by the formula wherein L³ independently represents a covalent bond or a divalent organic linking group, and wherein each Y¹, Y², and Y³ independently represents a hydrolyzable group or an alkyl group having from 1 to 7 carbon atoms, with the proviso that at least one of Y¹, Y², and Y³ is a hydrolyzable group; and b) cationic curative.

As used herein:

The prefix "hetero" refers to replacement of at least one carbon atom by N, O, S, or P.

The term "hydrocarbylene" refers to a divalent radical formable by removal of two hydrogen atoms from a hydrocarbon molecule.

The term "hydrolyzable silane group" means a group that will undergo an exchange reaction with water to form a Si—OH moiety, and which may further react to form siloxane groups. This definition includes OH as a hydrolyzable silane group.

The term "(meth)acryl" refers to the group —C(=O)CH=CH₂ (i.e., acryl) and/or the group —C(=O)C(CH₃)=CH₂ (i.e., methacryl). For example, a poly(meth)acrylate may include only acrylate groups, only methacrylate groups, or a combination thereof.

The terms "perfluoro-" and "perfluorinated" refer respectively to chemical groups and molecules in which essentially all of the carbon-bonded hydrogen has been replaced by fluorine. Perfluorinated compounds such as perfluoroalkyl groups are generally the product of a fluorination process (e.g. electrochemical fluorination using, for example anhydrous HF as a source of fluorine, or direct fluorination using elemental fluorine) and typically comprise a mixture of one or more perfluoroalkyl isomers and one or more hydride-containing compounds due to incomplete replacement of hydrogen by fluorine. Minor amounts (e.g., less than 5 percent, or less than 1 percent by weight) of such residual hydride content in the perfluoroalkyl groups are therefore within this definition. Complete replacement of carbon-bonded hydrogen with fluorine is also included within this definition.

The term "polymer" includes high polymers and oligomers (i.e., relatively low molecular weight polymers).

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The FIGURE may not be drawn to scale.

DETAILED DESCRIPTION

Curable antifouling compositions useful in practice of the present disclosure include cationic curative and at least one fluorinated polymer (hereinafter identified as fluoropolymer FP), that independently comprises:

at least one divalent group A represented by the formula wherein $R^1$ independently represents H or methyl, X independently represents a covalent bond or a divalent organic linking group, $L^1$ independently represents a covalent bond or a divalent organic linking group, and $R_{fl}$ independently represents a monovalent perflourinated organic group;

at least one divalent group B represented by the formula wherein $L^2$ independently represents a covalent bond or divalent organic linking group, k represents an integer in the range of from 1 to 4, $R^2$ independently represents H or an alkyl group having from 1 to 18 carbon atoms, and f independently represents an integer in the range of from 3 to 200, inclusive;

at least one divalent group C represented by the formula wherein $L^3$ independently represents a covalent bond or a divalent organic linking group, and each $Y^1$, $Y^2$, and $Y^3$ independently represents a hydrolyzable group or a hydrocarbyl group having from 1 to 10 carbon atoms, with the proviso that at least one of $Y^1$, $Y^2$, and $Y^3$ is a hydrolyzable group.

Fluorinated polymer FP may have any molecular weight consistent with a polymer. In some embodiments, the fluorinated polymer has an average molecular weight of 2,000 to 40,000 grams/mole, or even 10,000 to 30,000 grams/mole.

In some embodiments, the weight ratio of said at least one group A to the sum of said at least one group B and said at least one C is in a range of from 60:40 to 5:95, preferably in a range of from 20:80 to 45:55, but this is not a requirement.

In some embodiments, the weight ratio of said at least one group B to said at least one group C is in a range of from 1:99 to 90:10, preferably in a range of from 5:95 to 30:70, but this is not a requirement.

As specified above, each $R^1$ independently represents H or methyl. In some embodiments, each $R^1$ represents H. In some embodiments, each $R^1$ represents methyl.

As specified above, each $R^2$ independently represents H or an alkyl group having from 1 to 18 carbon atoms (e.g., methyl, ethyl, propyl, cyclohexyl, isooctyl, decyl, dodecyl, or octadecyl).

Each X independently represents a covalent bond or a divalent linking group. Examples of X divalent linking groups include: oxygen; and organic divalent groups such as, for example, —N(CH$_3$)—, sulfonylamino, aminosulfonyl, hydrocarbylene (e.g., alkylene, arylene, alkarylene, or aralkylene), heteroalkylene (e.g., —CH$_2$O— or —OCH$_2$—), carbonyl, oxycarbonyl, carbonyloxy, carbonylamino, aminocarbonyl, carbonylalkylamino, alkylaminocarbonyl, alkylamino, arylamino, and combinations thereof. X can be linear, branched, and or cyclic. It may be substituted with halogen (e.g., F, Cl, Br, or a combination thereof). In some preferred embodiments, X is carbonyloxy (i.e., forming a —C(=O)O-L$^1$- segment or a —C(=O)O-L$^2$- segment).

Each $L^1$ independently represents a covalent bond or a divalent linking group. Examples of $L^1$ divalent linking groups include, oxygen, organic divalent groups such as, for example, —N(CH$_3$)—, sulfonylamino, aminosulfonyl, hydrocarbylene (e.g., alkylene, arylene, alkarylene, or aralkylene), heteroalkylene (e.g., —CH$_2$O— or —OCH$_2$—), carbonyl, oxycarbonyl, carbonyloxy, alkylamino, arylamino, and combinations thereof. $L^1$ can be linear, branched, and or cyclic. It may be substituted with halogen (e.g., F, Cl, Br, or a combination thereof). In some embodiments, $L^1$ has from 1 to 4, 6, 10, 15, 25, or even 30 carbon atoms, inclusive. In some preferred embodiments, $L^1$ is selected from the group consisting of —CH$_2$CH$_2$NHC(=O)—, —CH$_2$CH$_2$OCH$_2$—, and —(CH$_2$CH$_2$O)$_2$CH$_2$—.

Each $R_{fl}$ independently represents a monovalent perfluorinated organic group. $R_{fl}$ may comprise linear, branched, and/or cyclic perfluorinated hydrocarbyl (i.e., with H replaced by F) groups, and can optionally contain one or more catenary heteroatoms such as oxygen or nitrogen. In some embodiments, $R_{fl}$ comprises from 1 to 6, 1 to 8, 1 to 10, or 1 to 12 carbon atoms, inclusive.

Exemplary $R_{fl}$ groups include linear or branched perfluoroalkyl groups having from 3 to 6 carbons (e.g., trifluoromethyl, pentafluoroethyl, heptafluoropropyl, nonfluorobutyl, undecafluoropentyl, and tridecafluorohexyl). Preferably, $R_{fl}$ comprises at least one of a perfluoro(polyethylenoxy) group, perfluoro(polypropylenoxy) group, perfluoro(polymethylenoxy) group, perfluoro(polybutylenoxy) group, or a combination thereof.

Useful $R_{fl}$ groups may include perfluorooxyalkyl groups represented by the formula wherein $R_f^3$ represents a linear, branched and/or cyclic perfluoroalkyl group having from 1 to 6 carbon atoms, Re represents a perfluoroalkyleneoxy group (i.e., a divalent perfluoroalkyleneoxy group) having from 1 to 4 carbon atoms or a combination of perfluoroalkyleneoxy groups having from 1 to 4 carbon atoms, $R_f^5$ represents a perfluoroalkylene group having from 1 to 6 carbon atoms, v is an integer in the range of from 1 to 100, inclusive, and q is 0 or 1.

One example of a useful perfluoroalkyl group ($R_f^3$) is CF$_3$CF$_2$CF$_2$—. Examples of useful perfluoroalkylene groups ($R_f^5$) include —CF$_2$CF$_2$CF$_2$—, —CF2-, and —CF(CF$_3$)CF$_2$—.

The perfluoroalkyleneoxy group Re can include the same of perfluoroalkyleneoxy units or of a mixture of different perfluoroalkyleneoxy units. When the perfluoroalkyleneoxy group includes different perfluoroalkyleneoxy units, the units can be present in a random configuration, alternating configuration or as blocks. Examples of useful perfluoroalkyleneoxy groups include [CF$_2$CF$_2$O]$_r$—; —[CF(CF$_3$)CF$_2$O]$_s$—, —[CF$_2$CF$_2$O]$_r$—[CF$_2$O]$_t$—, —[CF$_2$CF$_2$CF$_2$CF$_2$O]$_u$—, and —[CF$_2$CF$_2$O]$_r$—[CF(CF$_3$)CF$_2$O]$_s$—, wherein each of r, s, t and u is an integer of from 1 to 50 or even from 2 to 25. A preferred perfluorooxyalkyl group is CF$_3$CF$_2$CF$_2$O[CF(CF$_3$)CF$_2$O]$_s$—CF(CF$_3$)—, wherein s is an integer in the range of from 2 to 25, inclusive; preferably in the range of from 3 to 15, inclusive.

Perfluorooxyalkyl and perfluoroxyalkylene compounds may be obtained, for example, by the oligomerization of hexafluoropropylene oxide that results in a terminal carbonyl fluoride group. This carbonyl fluoride may be converted into an acid, ester, amide, or alcohol by reactions well known to those skilled in the art. The carbonyl fluoride or acid, ester or alcohol derived therefrom may then be reacted further to introduce the desired acrylate reactive groups according to known procedures.

Each $L^2$ independently represents a covalent bond or divalent linking group. Examples of $L^2$ divalent organic linking groups include hydrocarbylene (e.g., alkylene, arylene, alkarylene, or aralkylene), heteroalkylene (e.g., —CH$_2$O— or —OCH$_2$—), carbonyl, oxycarbonyl, carbonyloxy, alkylamino, arylamino, sulfonylamino, aminosulfonyl, and combinations thereof. $L^2$ can be linear, branched, and or cyclic. It may be substituted with halogen (e.g., F, Cl, Br, or a combination thereof. In some embodiments, $L^2$ has from 1 to 4, 6, 10, 15, 25, or even 30 carbon atoms, inclusive. In some preferred embodiments, $L^2$ is a covalent bond or —CH$_2$CH$_2$NHC(=O)O—.

Each $L^3$ independently represents a covalent bond or divalent linking group. Examples of $L^3$ divalent linking groups include hydrocarbylene (e.g., alkylene, arylene, alkarylene, or aralkylene), heteroalkylene (e.g., —CH$_2$O— or —OCH$_2$—), carbonyl, oxycarbonyl, carbonyloxy, alkylamino, arylamino, sulfonylamino, aminosulfonyl, and combinations thereof. $L^3$ can be linear, branched, and or cyclic. It may be substituted with halogen (e.g., F, Cl, Br, or a combination thereof. In some embodiments, $L^3$ has from 1 to 4, 6, 10, 15, 25, or even 30 carbon atoms, inclusive. In some preferred embodiments, $L^3$ is a covalent bond or —(C=O)NHCH$_2$CH$_2$—; for example, as might result from condensation of the corresponding alcohol with 2-isocyanatoalkylenetrialkoxysilane.

Examples of the divalent group —($C_kH_{2k}O$)— include —CH$_2$O—, —CH$_2$CH$_2$O—, —CH$_2$CH$_2$CH$_2$O—, —CH$_2$CH(CH$_3$)O—, —CH$_2$CH$_2$CH$_2$CH$_2$O—, —CH$_2$CH(CH$_3$)CH$_2$O— and combination thereof.

Each f independently represents an integer in the range of from 3 to 200, inclusive. Preferably, f is in a range of from 5 to 100, or 5 to 68, although this is not a requirement.

$Y^1$, $Y^2$, and $Y^3$ independently represent a hydrolyzable group or an alkyl group having from 1 to 6 carbon atoms, with the proviso that at least one of $Y^1$, $Y^2$, and $Y^3$ is a hydrolyzable group. Exemplary hydrolyzable groups include OH, Cl, alkoxy groups having from 1 to 6 carbon atoms (e.g., methoxy, ethoxy, propoxy, butoxy, hexoxy), alkanoyloxy groups having from 2 to 7 carbon atoms (e.g., acetoxy, propanoyloxy).

Fluoropolymer FP may comprise additional divalent groups, for example, as a result of inclusion of corresponding monofunctional ethylenically-unsaturated monomers prior to polymerization to form Fluoropolymer FP. Selection of such monomers is within the capability of one ordinary skill in the art. Examples of such divalent groups include those represented by the formula wherein $R^1$ is as previously defined and Z represents an alkylene group having from 2, 3, 4, 5, or 6 carbon atoms. Terminal —OH groups may be converted into a curable silane group, for example by reaction with an isocyanatoalkylsilane compound having one, two, or three hydrolyzable groups (e.g., as represented by the formula O=C=N (CH$_2$)$_d$SiY$^1$Y$^2$Y$^3$, wherein d represents an integer in the range of from 1 to 12, inclusive, and $Y^1$, $Y^2$, and $Y^3$ are as previously defined).

Fluoropolymer FP can be prepared by copolymerization of ethylenically-unsaturated (e.g., (meth)acrylate) monomers corresponding to the above-mentioned components.

Fluorinated oligomers having limited molecular weight may be prepared by copolymerization of ethylenically-unsaturated (e.g., (meth)acrylate) monomers corresponding to the above-mentioned components, using chain transfer agent and free-radical initiator in a suitable solvent under nitrogen atmosphere.

For example, monomers conforming to the formula CH$_2$=CR$^1$—X-L$^1$-R$_f$ can be prepared generally according to known methods such as, for example, the procedure in U.S. Patent Appl. Publ. Nos. 2010/0310875 A1 (Hao et al.) and 2011/0311826 A1 (Qiu et al.).

In some embodiments, the monomers may be produced by introducing (meth)acrylate groups at the hydroxyl group of fluorinated polyether compounds having a terminal hydroxyl group. In some embodiments, the fluorinated polyether compounds with a terminal hydroxyl group may be a highly fluorinated. Suitable examples of such hydroxyl-group containing fluorinated polyether compounds includes for example: HOCH$_2$CF$_2$O—(CF$_2$CF$_2$O)$_l$—(CF$_2$O)$_m$—CF$_2$CH$_2$OH, F—(CF$_2$CF$_2$CF$_2$O)$_l$—CF$_2$CF$_2$CH$_2$OH, F(CF(CF$_3$)CF$_2$O)l-CF(CF$_3$)CH$_2$OH, HOCH$_2$CF(CF$_3$)O—(CF$_2$CF(CF$_3$)O)$_l$—O—(CF$_2$)$_m$—O—(CF(CF$_3$)CF$_2$O)$_l$—OCF(CF$_3$)CH$_2$OH, HO(CH$_2$CH$_2$O)$_n$—CH$_2$CF$_2$O—(CF$_2$CF$_2$O)$_l$—(CF$_2$O)$_m$—CF$_2$CH$_2$(OCH$_2$CH$_2$)$_n$OH, CF$_3$OCF$_2$CF$_2$CF$_2$OCHFCF$_2$C(=O)NHCH$_2$CH$_2$OH, CF$_3$CF$_2$CF$_2$OCHFCF$_2$C(=O)NHCH$_2$CH$_2$OH, CF$_3$CF$_2$CF$_2$OCHFCF$_2$CH$_2$OH, CF$_3$CFHO(CF$_2$)$_5$CH$_2$OH, CF$_3$OCF$_2$OCF$_2$CF$_2$OCF$_2$CHFCF$_2$CH$_2$OH, CF$_3$(OCF$_2$)$_2$OCF$_2$CF$_2$OCHFCF$_2$CH$_2$OH, and HOCH$_2$CH(OH) CH$_2$OCH$_2$CF$_2$O(CF$_2$CF$_2$O)$_l$—(CF$_2$O)$_m$—CF$_2$CH$_2$OCH$_2$CH(OH)CH$_2$OH where each l, m, and n is an integer of at least 1.

In some embodiments, the perfluoropolyether group comprises an "HFPO-" end group, i.e., the end group F(CF(CF$_3$)CF$_2$O)$_u$CF(CF$_3$)— (of the methyl ester F(CF(CF$_3$)CF$_2$O)$_u$CF(CF$_3$)C(O)OCH$_3$) wherein u averages 2 to 50 or even 4 to 50. In some embodiments, u averages at least 3 or 4. Typically, u is no greater than 8 or 10. Such compounds generally exist as a distribution or mixture of oligomers with a range of values for u, so that the average value of u may be non-integer. In one embodiment, u averages about 7.

In some embodiments, the amount of ethylenically unsaturated fluorinated polyether monomer present in the reaction mixture used to form the copolymer composition of this disclosure can be about 1% to about 50% by weight, or 10% to 50% by weight, or even 20% to 40% by weight, of total monomer mixture.

Likewise, monomers conforming to the formula CH$_2$=CR$^1$—X-L$^2$-(C$_k$H$_{2k}$O)$_f$R$^2$ may be prepared generally according to known methods such as, for example, that described in U.S. Patent Appl. Publ. No. 2011/0311826 A1 (Qiu et al.). For example, ethylenically-unsaturated polyoxyalkylene monomers may be prepared by reacting an unsaturated carboxylic acid, such as acrylic acid or methacrylic acid, with an equimolar amount of a monoalcohol of a polyoxyalkylene. The esterification reaction is generally conducted under anhydrous conditions in an organic solvent, such as toluene, which preferably forms an azeotropic mixture with the water which is generated by the esterification reaction. Typically, the alcohol is combined with the organic solvent and the unsaturated carboxylic acid is then added. The reaction is conducted in the presence of an acid catalyst, such as para-toluenesulfonic acid, and a free-radical inhibitor, such as copper powder. The reaction mixture is refluxed for several hours under a nitrogen atmosphere and the resultant water removed by azeotropic distillation.

Examples of commercially available polyoxyalkylenes which may be used to prepare the monomers include the PLURONIC oxypropylene/oxyethylene copolymers available from BASF Corp., Mount Olive, N.J., and the CARBOWAX polyoxyethylenes available from Union Carbide Corp., Houston Tex. Polyoxyethylenes which may be used with the above-described procedure include, for example, those having the trade designations CARBOWAX 350, CARBOWAX 550, CARBOWAX 750, CARBOWAX 2000, and CARBOWAX 5000 (i.e., methoxypolyoxyethylene ethanols with molecular weights of about 350, 550, 750, 2000 and 5000 grams/mole, respectively).

Examples of commercially available mono-acrylate polyoxyalkylene monomers useful in this disclosure include, for example, methoxy polyethylene glycol monoacrylate, methoxy polyethylene glycol monomethacrylate, alkoxylated tetrahydrofurfuryl acrylate, alkoxylated lauryl acrylate, alkoxylated phenyl acrylate, tetrahydrofurfuryl acrylate, ethoxylated nonylphenol acrylate, propoxylated allyl methacrylate, ethoxylated hydroxyethyl methacrylate, ethoxylated nonylphenol methacrylate, and polypropylene glycol monomethacrylate. Particularly useful polyoxyalkylene (meth)acrylate monomers include those which are commercially available, for example as CD550, CD551, CD552, CD553 from Sartomer Company, Inc., Exton, Pa.

In some embodiments, the amount of ethylenically-unsaturated polyoxyalkylene monomer present in the monomer mixture used to form the copolymer composition of this disclosure can be about 1% to about 50% by weight, or 10% to 50% by weight, or even 20% to 40% by weight, of total monomer mixture.

Useful silane components conforming to the formula $CH_2=CR^1-X-L^3-SiY^1Y^2Y^3$ can be prepared according to known methods such as, for example, the procedure described in U.S. Pat. No. 5,717,125 (Wolter et al.). Examples suitable ethylenically unsaturated hydrolyzable silane monomers include, for example, vinyl silanes such as vinyltrimethoxysilane, or vinyltriethoxysilane, and (meth) acrylate silanes such as, 3-(acryloyloxy)propyltrimethoxysilane, 3-(methacryloyloxy)propyltrimethoxysilane, 3-(acryloyloxy)propyltriethoxysilane, 3-(methacryloyloxy) propyltriethoxysilane, 3-(acryloyloxy) propyltripropoxysilane, 3-(methacryloyloxy) propyltripropoxysilane, [3-acryloyloxy)propyl] methyldimethoxysilane, [3-(methacryloyloxy)propyl] methyldimethoxysilane, [3-(acryloyloxy)propyl] methyldiethoxysilane, [3-(methacryloyloxy)propyl] methyldiethoxysilane, [3-(acryloyloxy)propyl] methyldipropoxysilane, [3-(methacryloyloxy)propyl] methyldipropoxysilane, [4-(acryloyloxy)butyl] phenyldimethoxysilane, [4-(methacryloyloxy)butyl] phenyldimethoxysilane, [3-(acryloyloxy)propyl] phenyldiethoxysilane, [3-(methacryloyloxy)propyl] phenyldiethoxysilane, [3-(acryloyloxy)propyl]phenyldipropoxysilane, [3-(methacryloyloxy)propyl]phenyldipropoxysilane, [3-(acryloyloxy)propyl]dimethylmethoxysilane, [3-(methacryloyloxy)propyl] dimethylmethoxysilane, [3-(acryloyloxy)propyl] dimethylethoxysilane, [3-(methacryloyloxy)propyl] dimethylethoxysilane, [3-(acryloyloxy)propyl] phenylmethylmethoxysilane, [3-(methacryloyloxy)propyl] phenylmethylmethoxysilane, [3-(acryloyloxy)propyl] phenylmethylethoxysilane, and [3-(methacryloyloxy) propyl]phenylmethylethoxysilane.

Alternatively, some such compounds (e.g., 3-(trimethoxysilyl)propyl methacrylate, or 3-(trimethoxysilyl)propyl methacrylate) are commercially available, for example, from Sigma-Aldrich Corp, St. Louis, Mo.

Fluoropolymer FP can be prepared according to methods known in the art; for example, by free-radical polymerization generally as described in U.S. Pat. No. 3,553,179 (Bartlett) and U.S. Pat. No. 3,544,537 (Brace) as well as U.S. Patent Appl. Publ. Nos. 2004/0077775 A1 (Audenaert et al.) and 2011/0311826 A1 (Qiu et al.). Further details and methods for how to make compounds corresponding to Fluoropolymer FP and related derivatives can be found in U.S. Patent Appl. Publ. No. 2010/0310875 A1 (Hao et al.). As is known in the art, the molecular weight of Fluoropolymer FP can be controlled by the reaction conditions such as, for example, reaction time, reaction temperature, free-radical initiator amount, and chain transfer agent.

Fluoropolymer FP may have a relatively low polydispersity. In some embodiments, the polydispersity may be less than 5, 4, 3, 2.5, or even less than 2.

Fluoropolymer FP may have any molecular weight subject to the above formula restrictions. The molecular weight of the fluoropolymer is preferably less than 100,000 grams/ mole (g/mol), less than 80,000 g/mol, for its solubility and processibility. In some embodiments (e.g., in those embodiments in which $L^1$ and $L^2$ represent a covalent bond), fluoropolymer FP preferably has a number average molecular weight of at least 700 g/mol, 800 g/mol, 900 g/mol, 1000 g/mol, 1100 g/mol, 1200 g/mol, 1300 g/mol, 1400 g/mol, 1500 g/mol, 1600 g/mol, 1700 g/mol, 1800 g/mol, 1900 g/mol, or even at least 2000 g/mol, and preferably no greater than about 60000 g/mol, 50000 g/mol, or 40000 g/mol.

Curable antifouling compositions according to the present disclosure may optionally further comprise at least one epoxysilane compound, which may impart for better coating quality, durability and even antifouling performance. As used herein, the term "epoxysilane compound" refers to a compound that has both cationically curable silane and epoxy groups. In some embodiments, the epoxysilane compounds have exactly one each of hydrolyzable silane and epoxy groups. In some embodiments, useful epoxysilane compounds are represented by the formula wherein Q represents a covalent bond, alkylene, arylene, or —CH$_2$O—;

$Y^1$, $Y^2$, and $Y^3$ are as previously defined; and $L^4$ represents a divalent linking group. Examples of $L^4$ divalent linking groups include hydrocarbylene (e.g., alkylene, arylene, alkarylene, or aralkylene), heteroalkylene (e.g., —CH$_2$O—, —CH$_2$OCH$_2$CH$_2$CH$_2$—, or —OCH$_2$—), and combinations thereof. $L^4$ can be linear, branched, and or cyclic. It may be substituted with halogen (e.g., F, Cl, Br, or a combination thereof. In some embodiments, $L^4$ has from 1 to 4, 6, 10, 15, 25, or even to 30 carbon atoms, inclusive. In some embodiments, $L^4$ comprises at least 2, 3, or 4 carbon atoms.

Exemplary useful epoxysilanes include 3-glycidoxypropyltrimethoxysilane, 3-glycidoxypropyltriethoxysilane, 3-glycidoxypropylmethyldiethoxysilane, 3-glycidoxypropylmethyldimethoxysilane, and beta-(3,4-epoxycyclohexyl)ethyltrimethoxysilane.

In some embodiments, the total amount of epoxysilane compound(s) can be, for example, at least 50, 55, 60, 65, 70, 75, 80, 85, 90, 95, or even at least 99 percent by weight, based on the combined total weight of the fluoropolymer FP, epoxysilane compound, and cationic curative.

Solvent may be present in the coating compositions of fluoropolymer FP and its combination with ethylenically-unsaturated free-radically polymerizable compounds and free-radical initiator. Useful solvent includes, for example, ether, ester, ketone and combination. Representative solvents are CH$_3$OCH$_2$CH$_2$OCH$_3$, CH$_3$OCH(CH$_3$)CH$_2$OCH$_3$, CH$_3$OCH$_2$CH$_2$CH$_2$OCH$_3$CH$_3$OCH$_2$CH$_2$OCH$_2$CH$_2$OCH$_3$, tetrahydrofuran, diethyl ether, t-butyl methyl ether, acetone, methyl ethyl ketone, methyl isobutylene ketone, and methyl propyl ketone, ethyl acetate, methyl acetate, butyl acetate, isobutyl acetate, and combinations thereof.

The cationic curative, which may comprise one or more compounds, serves to generate Lewis acid and/or Brönsted acid species that cure (e.g., polymerize and/or crosslink) cationically polymerizable and/or crosslinkable compounds such as, for example, hydrolyzable silanes (including epoxysilanes). Examples of useful cationic curatives include thermal cationic curatives and photo-activated cationic curatives (i.e., compounds that form cationic curatives upon exposure to actinic radiation).

Thermal cationic curatives include, for example, those selected from the group consisting of Lewis acids and Lewis acid complexes including aluminum trichloride; aluminum tribromide; boron trifluoride; boron trichloride; antimony pentafluoride; titanium tetrafluoride; and boron trifluoride and boron trichloride complexes including, for example, BF$_3$-diethylamine and a BCl$_3$-amine complex available under the trade designation OMICURE BC-120 from CVC Specialty Chemicals, Inc., Maple Shade, N.J.

Photoactivated cationic curatives, also known as photoacid generators, are activated by exposure to actinic radiation (e.g., ultraviolet light and/or visible light). Useful photoacid generators may form protic and/or Lewis acids. Useful photoacid generators include salts having onium cations and halogen-containing complex anions of a metal or metalloid (e.g., aryl sulfonium salts available under the trade designations CYRACURE UVI-6974 and CYRACURE UVI-6976 from Union Carbide Corporation, Danbury, Conn.). Other useful photoacid generators include metallocene salts having organometallic complex cations and halogen-containing complex anions of a metal or metalloid which are further described in U.S. Pat. No. 4,751,138 (Tumey et al.). Another useful photoacid generator is the combination of an organometallic salt and an onium salt described in U.S. Pat. No. 4,985,340 (Palazzotto et al.) and U.S. Pat. No. 6,204,350 (Liu et al.), and European Patent Publ. Nos. 306,161 (Palazzotto et al.), published Mar. 8, 1989; and 306,162 (Palazzotto et al.); published Mar. 8, 1989. Still other useful photoacid generators include ionic salts of organometallic complexes in which the metals are selected from the elements of Periodic Groups, IVB, VB, VIB, VIIB, and VIII which are described in European Patent Publ. No. 109,851 (Palazzotto et al.), published May 30, 1984.

The cationic curative, which may be used alone or as a combination of cationic curatives, is typically present in an effective amount (i.e., at least sufficient quantity to effect at least partial curing of the curable antifouling composition. Typically, the cationic curative comprises from 0.01, 0.1, or even from 0.5 percent up to 5 or 10 percent based on the combined total weight of the fluoropolymer FP, optional epoxysilane compound, and cationic curative. In some embodiments, the weight ratio of fluoropolymer FP to the cationic curative is in the range of from 95:5 to 99.5:0.5.

In some embodiments, fluoropolymer FP comprises at least 50 percent of the total weight of fluoropolymer FP, optional epoxysilane compound, and cationic curative combined.

Optionally, curable and/or at least partially cured antifouling compositions may further comprise one or more cationic curable compounds represented by the formula for coating property adjustment:

$(R^3)_iM(Y)_{j-i}$ wherein M is selected from the group consisting of Si, Ti, Zr, B, Al, Ge, V, Pb, Sn, and Zn; and $R^3$ represents a non-hydrolyzable group; j is 3 or 4 depending on the valence of M; i is 0, 1, or 2, and Y represents a hydrolyzable group. Such compounds are described in more detail in U.S. Pat. No. 7,728,098 B2 (Dams et al.) in col. 15, line 39 through column 16, line 29.

Representative examples include tetramethoxysilane, tetraethoxysilane, methyltriethoxysilane, methyltrimethoxysilane, dimethyldiethoxysilane, octadecyltriethoxysilane, octadecyltrimethoxysilane, methyltrichlorosilane, tetramethyl orthotitanate, tetraethyl orthotitanate, tetra-iso-propyl orthotitanate, tetra-n-propyl orthotitanate, tetra(2-ethylhexyl) titanate, tetraethyl zirconate, tetra-isopropyl zirconate, and tetra-n-propyl zirconate.

Optionally, curable antifouling compositions may further comprise one or more fillers such as, for example, nanometer-scale silica for coating property adjustment.

While the antifouling properties of coatings resulting from at least partial curing of fluoropolymer FP were previously unknown, the present inventors have now discovered that they indeed may have beneficial antifouling properties with respect to one or more microorganisms. For example, in some embodiments, biofouling may be reduced by at least a factor of 1.1, 1.5, 2, 3, 4, 5, 6, 7, 8, 9, 10, or more depending on the microorganism and test method selected.

The term "microorganism" is generally used to refer to any prokaryotic or eukaryotic microscopic organism, including without limitation, one or more of bacteria (e.g., motile or vegetative, Gram positive or Gram negative), bacterial spores or endospores, algae (e.g., *Navicula incerta*), fungi (e.g., yeast, filamentous fungi, fungal spores), mycoplasmas, and protozoa, as well as combinations thereof. In some cases, the microorganisms of particular interest are those that are pathogenic, and the term "pathogen" is used to refer to any pathogenic microorganism. Examples of pathogens can include, but are not limited to, both Gram positive and Gram negative bacteria, fungi, and viruses including members of the family Enterobacteriaceae, or members of the family Micrococaceae, or the genera *Staphylococcus* spp., *Streptococcus*, spp., *Pseudomonas* spp., *Enterococcus* spp., *Salmonella* spp., *Legionella* spp., *Shigella* spp., *Yersinia* spp., *Enterobacter* spp., *Escherichia* spp., *Bacillus* spp., *Listeria* spp., *Campylobacter* spp., *Acinetobacter* spp., *Vibrio* spp., *Clostridium* spp., *Klebsiella* spp., *Proteus* spp. and *Corynebacterium* spp. Particular examples of pathogens can include, but are not limited to, *Escherichia coli* including enterohemorrhagic *E. coli* e.g., serotype O157:H7, O129:H11; *Pseudomonas aeruginosa; Bacillus cereus; Bacillus anthracis; Salmonella enteritidis; Salmonella enterica* serotype *Typhimurium; Listeria monocytogenes; Clostridium botulinum; Clostridium perfringens; Staphylococcus aureus*; methicillin-resistant *Staphylococcus aureus; Campylobacter jejuni; Yersinia enterocolitica; Vibrio vulnificus; Clostridium difficile*; vancomycin-resistant *Enterococcus; Klebsiella pnuemoniae; Proteus mirabilus* and *Enterobacter* [*Cronobacter*] *sakazakii*.

Accordingly, curable antifouling compositions according to the present disclosure are useful, for example, for making an article. In a typical such method, a curable antifouling composition according to the present disclosure is applied to (e.g., coated on, or in the case of a self-supporting film laminated to) at least a portion of a surface of a substrate, then the curable antifouling composition is at least partially cured (e.g., typically at least sufficiently cured to achieve a durable film).

The curable antifouling composition may be applied to the substrate using any suitable technique including, for example, dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Optionally, but typically, at least a portion (including all) of any volatile organic solvents are removed prior to any curing of the curable antifouling composition.

After application, the curable antifouling composition is at least partially cured; for example, as described elsewhere herein. The thickness of the resulting antifouling composition is typically at least 0.5 microns, preferably at least 1 micron, and more preferably at least 2 microns, although this is not a requirement. Preferably, the thickness ranges from 3 microns to 5 microns, although other thicknesses may also be used.

Figure 1:
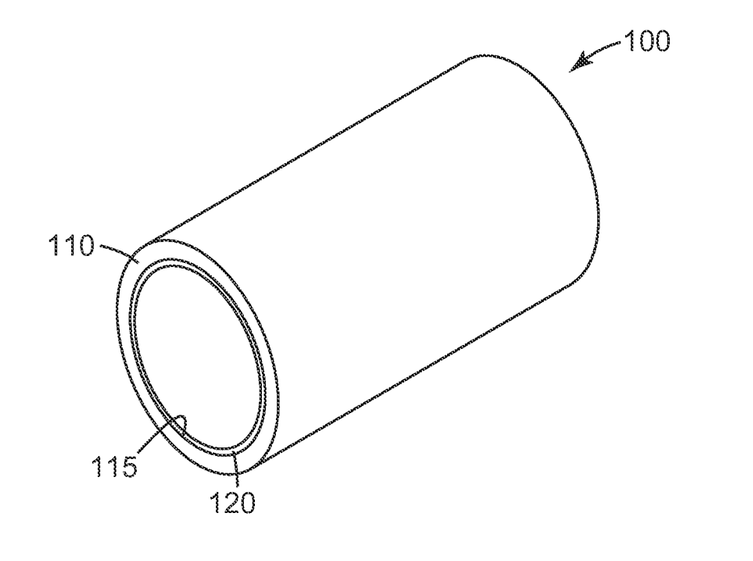
FIG. 1 is a schematic perspective view of an exemplary pipe having an inner antifouling coating.

Antifouling compositions according to the present disclosure are especially useful as protective coating on substrates included in articles that are subjected to prolonged exposure to water. For example, as shown in FIG. 1 exemplary article 100 comprises pipe 110 with antifouling coating 120 disposed on its inner surface 115.

Exemplary substrates include marine vessel hulls, anchors, piers, docks, caissons, invasive medical devices (e.g., including prosthetic heart valves, urinary catheters, venous catheters, endotracheal tubes, and orthopedic implants), non-invasive medical devices (e.g., medical examination tables, wound dressings, and stethoscopes), handrails, door knobs, countertops, membrane support frames, heat exchangers, microelectrochemical drug delivery devices, and papermaking machines, tanks for holding liquid (e.g., bioreactor tanks, water storage tanks, totes, and cisterns), and mariculture apparatuses (e.g., cages, pens, and baskets). Useful substrates also include plumbing (e.g., pipes and tubing for conveying water) and plumbing fixtures. Plumbing is the system of pipes and drains for the distribution of water (e.g., potable water) and the removal of waterborne wastes. Plumbing fixtures include, e.g., bidets, channel drains, drinking fountains, sinks, toilets, urinals, showers, bathtubs, and faucets.

Select Embodiments of the Present Disclosure

In a first embodiment, the present disclosure provides a curable antifouling composition comprising components:

a) at least one fluorinated polymer, wherein each said at least one fluorinated polymer independently comprises:

at least one divalent group A represented by the formula wherein $R^1$ independently represents H or methyl, X independently represents a covalent bond or a divalent organic linking group, $L^1$ independently represents a covalent bond or a divalent organic linking group, and $R_f$ independently represents a monovalent perflourinated organic group;

at least one divalent group B represented by the formula wherein $L^2$ independently represents a covalent bond or divalent organic linking group, k represents an integer in the range of from 1 to 4, $R^2$ independently represents H or an alkyl group having from 1 to 18 carbon atoms, and f independently represents an integer in the range of from 3 to 200, inclusive;

at least one divalent group C represented by the formula wherein $L^3$ independently represents a covalent bond or a divalent organic linking group, and each $Y^1$, $Y^2$, and $Y^3$ independently represents a hydrolyzable group or a hydrocarbyl group having from 1 to 10 carbon atoms, with the proviso that at least one of $Y^1$, $Y^2$, and $Y^3$ is a hydrolyzable group; and b) cationic curative.

In a second embodiment, the present disclosure provides a curable antifouling composition according to the first embodiment, wherein said cationic curative comprises a photoacid generator.

In a third embodiment, the present disclosure provides a curable antifouling composition according to the first or second embodiment, wherein the curable antifouling composition further comprises:

c) an epoxysilane compound.

In a fourth embodiment, the present disclosure provides a curable antifouling composition according to any one of the first to third embodiments, wherein the fluorinated polymer has an average molecular weight in a range of from 2000 grams/mole to 30,000 grams/mole.

In a fifth embodiment, the present disclosure provides a curable antifouling composition according to any one of the first to fourth embodiments, wherein f is in a range of from 5 to 100.

In a sixth embodiment, the present disclosure provides a curable antifouling composition according to any one of the first to fifth embodiments, wherein components a) and b) are present in a weight ratio of from 95:5 to 99.5:0.5.

In a seventh embodiment, the present disclosure provides a curable antifouling composition according to any one of the first to sixth embodiments, wherein the weight ratio of said at least one group A to the sum of said at least one group B and said at least one C is in a range of from 60:40 to 5:95.

In an eighth embodiment, the present disclosure provides a curable antifouling composition according to any one of the first to seventh embodiments, wherein the weight ratio of said at least one group B to said at least one group C is in a range of from 1:99 to 90:10.

In a ninth embodiment, the present disclosure provides a method of using a curable antifouling composition, the method comprising:

applying a curable antifouling composition to at least a portion of a surface of a substrate, wherein the substrate is selected from the group consisting of marine vessel hulls, anchors, piers, docks, caissons, invasive medical devices, non-invasive medical devices, handrails, door knobs, countertops, membrane support frames, heat exchangers, microelectrochemical drug delivery devices, papermaking machines, tanks for holding liquid, water pipes, plumbing fixtures, and mariculture apparatuses; and at least partially curing the curable antifouling composition, wherein the curable antifouling composition comprises components:

a) at least one fluorinated polymer, wherein each said at least one fluorinated polymer independently comprises:

at least one divalent group A represented by the formula wherein $R^1$ independently represents H or methyl, X independently represents a covalent bond or a divalent organic linking group, $L^1$ independently represents a covalent bond or a divalent organic linking group, and $R_{fl}$ independently represents a monovalent perflourinated organic group;

at least one divalent group B represented by the formula wherein $L^2$ independently represents a covalent bond or divalent organic linking group, k represents an integer in the range of from 1 to 4, $R^2$ independently represents H of an alkyl group having from 1 to 18 carbon atoms, and f independently represents an integer in the range of from 3 to 200, inclusive;

at least one divalent group C represented by the formula wherein $L^3$ independently represents a covalent bond or a divalent organic linking group, and wherein each $Y^1$, $Y^2$, and $Y^3$ independently represents a hydrolyzable group or an alkyl group having from 1 to 7 carbon atoms, with the proviso that at least one of $Y^1$, $Y^2$, and $Y^3$ is a hydrolyzable group; and b) cationic curative.

In a tenth embodiment, the present disclosure provides a curable antifouling composition according to the ninth embodiment, wherein said cationic curative comprises a photoacid generator.

In an eleventh embodiment, the present disclosure provides a curable antifouling composition according to the ninth or tenth embodiments, wherein f is in a range of from 5 to 100.

In a twelfth embodiment, the present disclosure provides a curable antifouling composition according to any one of the ninth to eleventh embodiments, wherein the curable antifouling composition further comprises:

c) an epoxysilane compound.

In a thirteenth embodiment, the present disclosure provides an article comprising a substrate having a surface, wherein at least a portion of the surface has an antifouling coating thereon, wherein the substrate is selected from the group consisting of marine vessel hulls, anchors, piers, docks, caissons, invasive medical devices, non-invasive medical devices, handrails, door knobs, countertops, membrane support frames, heat exchangers, microelectrochemical drug delivery devices, papermaking machines, tanks for holding liquid, water pipes, plumbing fixtures, and mariculture apparatuses, wherein the antifouling coating comprises an at least partially cured curable antifouling composition, and wherein the curable antifouling composition comprises components:

a) at least one fluorinated polymer, wherein each said at least one fluorinated polymer independently comprises:

at least one divalent group A represented by the formula wherein $R^1$ independently represents H or methyl, X independently represents a covalent bond or a divalent organic linking group, $L^1$ independently represents a covalent bond or a divalent organic linking group, and $R_{fl}$ independently represents a monovalent perflourinated organic group;

at least one divalent group B represented by the formula wherein $L^2$ independently represents a covalent bond or divalent organic linking group, k represents an integer in the range of from 1 to 4, $R^2$ independently represents H of an alkyl group having from 1 to 18 carbon atoms, and f independently represents an integer in the range of from 3 to 200, inclusive;

at least one divalent group C represented by the formula wherein $L^3$ independently represents a covalent bond or a divalent organic linking group, and wherein each $Y^1$, $Y^2$, and $Y^3$ independently represents a hydrolyzable group or an alkyl group having from 1 to 7 carbon atoms, with the proviso that at least one of $Y^1$, $Y^2$, and $Y^3$ is a hydrolyzable group; and b) cationic curative.

In a fourteenth embodiment, the present disclosure provides an article according to the thirteenth embodiment, wherein said cationic curative comprises a photoacid generator.

In a fifteenth embodiment, the present disclosure provides an article according to the thirteenth or fourteenth embodiments, wherein f is in a range of from 5 to 68.

In a sixteenth embodiment, the present disclosure provides an article according to any one of the thirteenth to fifteenth embodiments, wherein the curable antifouling composition further comprises:

c) an epoxysilane compound.

In a seventeenth embodiment, the present disclosure provides an article according to any one of the thirteenth to sixteenth embodiments, wherein the weight ratio of said at least one group A to the sum of said at least one group B and said at least one C is in a range of from 60:40 to 5:95. In an eighteenth embodiment, the present disclosure provides an article according to any one of the thirteenth to seventeenth embodiments, wherein the weight ratio of said at least one group B to said at least one group C is in a range of from 1:99 to 90:10.

Objects and advantages of this disclosure are further illustrated by the following non-limiting examples, but the particular materials and amounts thereof recited in these examples, as well as other conditions and details, should not be construed to unduly limit this disclosure.

Examples

Unless otherwise noted, all parts, percentages, ratios, etc. in the Examples are by weight.

The following designations are used in the Examples: "AM" refers to acrylic monomer or oligomer; "I" refers to initiator; "S" refers to solvent; "C" refers to compound, and "CT" refers to chain transfer agent.

Materials Abbreviations

S1 ACS reagent grade (>99.5%) ethyl acetate, product #319902, Sigma-Aldrich Corp., St. Louis, Mo.

S2 ACS reagent grade (>99%) 2-butanone, product #360473, Sigma-Aldrich Corp.

AM1 F(CF(CF$_3$)CF$_2$O)$_{6.84}$CF(CF$_3$)C(=O)NHCH$_2$CH$_2$OC(=O)C(CH$_3$)=CH$_2$, average molecular weight of 1344 grams/mole (g/mol), prepared generally according to the procedure described in U.S. Patent Appl. Publ. No. 2004/0077775 A1 (Audenaert et al.).

AM2 Methoxy polyethylene glycol (1100) monomethacrylate, $M_n$=~1100 g/mol, Sigma-Aldrich Corp.

AM3 Methoxy polyethylene glycol (350) monomethacrylate, $M_n$=~350 g/mol, available as CD-550 from Sartomer USA, LLC, Exton, Pa.

AM4 Gamma-methacryloxypropyltrimethoxysilane, available as SILQUEST A-174 from Momentive Performance Materials Holdings, Inc., Columbus, Ohio.

CT1 Gamma-mercaptopropyltrimethoxysilane chain transfer agent, available as SILQUEST A-189 from Momentive Performance Materials Holdings, Inc.

I1 2,2'-Azobis(2-methylbutyronitrile) thermally activated free-radical initiator, available as VAZO 67 initiator from E. I. du Pont de Nemours and Co., Wilmington, Del.

I2 Photoactivated cationic curative, 50% mixed triarylsulfonium hexafluoroantimonate salts in propylene carbonate, available as CYRACURE UVI-6976 from Dow Corning, Midland, Mich.

HC1 3-Glycidoxypropyltrimethoxysilane hardcoat, available as SILQUEST A-187 from Momentive Performance Materials Holdings, Inc.

Bacterial stock cultures (*S. epidermidis* (ATCC #35984) and *E. coli* (ATCC #12435)) were obtained from The American Type Culture Collection, Manassas, Va.

*Navicula incerta* diatom is a natural isolate obtained from the Callows group, University of Birmingham, Birmingham, England.

Preparation of Polymers P1-P7

Polymer P1 was prepared by charging a 4-ounce (120-mL) bottle equipped with a magnetic stir bar with 4.0 grams (g) of AM1, 2.0 g of AM3, 4.0 g of AM4, 0.1 g of CT1, 0.215 g of I1, and 40 g of 51. The solution was bubbled with nitrogen for one minute. The bottle was sealed and the solution was polymerized at 70° C. for 24 hours with constant stirring. The resulting solution was stirred at 70° C. for 2 hours, yielding a clear solution polymer with ~25% solids by weight. Polymers P2-P7 were prepared according to the same procedure, except that the compositions were varied as shown in Table 1. The solutions contained about 20% solids by weight.

TABLE 1

| POLYMER | POLYMER COMPOSITION, parts by weight | | | | | | | % |
| | AM1 | AM2 | AM3 | AM4 | CT1 | I1 | S1 | SOLIDS |
| --- | --- | --- | --- | --- | --- | --- | --- | --- |
| P1 | 4 | | 2 | 4 | 0.1 | 0.215 | 40 | 20.50% |
| P2 | 4 | | 2 | 4 | 0.5 | 0.215 | 40 | 21.13% |
| P3 | 4 | | 2 | 4 | 1.0 | 0.215 | 40 | 21.90% |
| P4 | 4 | | 3 | 3 | 0.5 | 0.215 | 40 | 21.13% |
| P5 | 4 | | 4 | 2 | 0.5 | 0.215 | 40 | 21.13% |
| P6 | 4 | 2 | | 4 | 0.2 | 0.215 | 40 | 20.66% |
| P7 | 4 | 4 | | 2 | 0.4 | 0.215 | 40 | 20.97% |

Examples 1-15 and Comparative Example A

Coating solutions having the compositions reported in Table 2 were prepared by mixing 3 percent I2 photoacid generator (prepared as a 10% solids solution in S2) with the polymer solutions P1-P7. The coating solutions were coated onto the primed side of a polyester (PET) film (MELINEX 618, E. I. du Pont de Nemours and Co.) using a wire-wound rod (RD Specialties, Webster, N.Y.). The wire-wound rods used were #3 (nominal wet film thickness=6.9 microns), #6 (nominal wet film thickness=13.7 microns), #12 (nominal wet film thickness=27.4 microns). The coated films were dried in an oven set at 90° C. for 1 minute, and then cured in a nitrogen atmosphere using a UV light processor (LIGHT-HAMMER 6 UV, Fusion UV Systems Inc., Gaithersburg, Md.) equipped with an H-bulb at 100% lamp power. The films were cured using 2 passes through the UV processor at a line speed of 30 feet/minute (9.1 m/min)

for at least one hour. To quantify the amount of biofilm on the surface, crystal violet was extracted into 0.5 mL 33% glacial acetic acid for 15 minutes and the absorbance at 600 nm was recorded using a TECAN SAFIRE2 multi-well plate reader.

Antifouling coating performance was assessed comparatively using a Figure of Merit. The value and its corresponding standard deviation were determined as shown below.

$$\text{Figure of Merit} = X_2 - X_1$$

TABLE 2

| EXAMPLE | PERCENT BY WEIGHT | | | | | | | | | | WIRE-WOUND COATING ROD USED |
|---|---|---|---|---|---|---|---|---|---|---|---|
| | P1 | P2 | P3 | P4 | P5 | P6 | P7 | HC1 | I2 | S2 | |
| 1 | 97.00 | | | | | | | | 0.30 | 2.70 | #6 |
| 2 | | 97.00 | | | | | | | 0.30 | 2.70 | #6 |
| 3 | | | 97.00 | | | | | | 0.30 | 2.70 | #6 |
| 4 | | | | 97.00 | | | | | 0.30 | 2.70 | #6 |
| 5 | | | | | 97.00 | | | | 0.30 | 2.70 | #6 |
| 6 | | | | | | 97.00 | | | 0.30 | 2.70 | #6 |
| 7 | | | | | | | 97.00 | | 0.30 | 2.70 | #6 |
| 8 | | | | | 87.30 | | | 9.70 | 0.30 | 2.70 | #6 |
| 9 | | | | | 48.50 | | | 48.50 | 0.30 | 2.70 | #6 |
| 10 | | | | | 9.70 | | | 87.30 | 0.30 | 2.70 | #6 |
| 11 | | | | | 87.30 | | | 9.70 | 0.30 | 2.70 | #3 |
| 12 | | | | | 87.30 | | | 9.70 | 0.30 | 2.70 | #12 |
| 13 | | | | | | | 87.30 | 9.70 | 0.30 | 2.70 | #6 |
| 14 | | | | | | | 48.50 | 48.50 | 0.30 | 2.70 | #6 |
| 15 | | | | | | | 9.70 | 87.30 | 0.30 | 2.70 | #6 |
| Comparative Example A | | | | | | | | 97.00 | 0.30 | 2.70 | #6 |

Antifouling Test Procedure

To facilitate the evaluation of a large number of test materials, samples were evaluated for the retention of bacterial biofilm grown under low shear conditions using a high-throughput assay. Prior to testing for biofilm retention, residual components that could potentially leach from test materials and interfere with the biological assays designed to characterize their performance were extracted into 1 mL phosphate buffered saline for 24 hours. Extracts were used to conduct a leachate toxicity assay as follows: After extraction, 0.05 mL of a bacterial suspension (S. aureus or E. coli at approximately $10^8$ cells/mL) was added to 0.9 mL of coating leachate supplemented with 0.1 mL growth medium (Tryptic Soy Broth (TSB) or M63D). Subsequently, 0.2 mL of the resulting liquid was transferred in triplicate to a sterile 96-well plate, incubated for 24 h at 37° C., and assessed for bacterial growth by measuring absorbance at 600 nm using a TECAN SAFIRE2 multi-well plate reader. Samples were then tested for biofilm retention against S. epidermidis (ATCC #35984) and E. coli (ATCC #12435) such that one control well (growth medium only) and one replicate sample well (growth medium+bacteria) were evaluated for each material against each bacterial species. To grow biofilms, S. epidermidis and E. coli were first re-suspended to a final cell density of $10^8$ cells/mL in TSBD and M63D, respectively, and 1.0 mL of the bacterial suspension was then added to each test well of the array plate. After static incubation at 37° C. for 24 hours, wells were rinsed three times with 1.0 mL deionized water to remove planktonic or loosely attached cells. Biofilm retained on the surface was then stained with crystal violet (0.3% solution), after which the surfaces were rinsed three times with 1.0 mL deionized water and air dried wherein:

$X_1$=average absorbance or optical density or percent removal for the test surface;

$X_2$=average absorbance or optical density or percent removal for a control surface without antifouling coating;

Table 3 reports results of testing Examples 1 to 15 and Comparative Example A using the Antifouling Test Procedure (above). Any positive number in the Figure of Merit means an antifouling effect was observed. The bigger numbers indicate the bigger difference in comparison with the control, and are better in antifouling performance in each test method.

TABLE 3

| EXAMPLE | S. epidermidis, FIGURE OF MERIT | E. coli, FIGURE OF MERIT |
|---|---|---|
| 1 | 0.104 | 0.558 |
| 2 | 0.869 | 0.579 |
| 3 | 0.140 | 0.684 |
| 4 | 0.662 | 1.741 |
| 5 | 1.032 | 1.420 |
| 6 | 0.314 | 0.799 |
| 7 | 0.252 | 1.156 |
| 8 | 1.792 | 1.780 |
| 9 | 0.813 | 0.248 |
| 10 | 0.505 | 0.451 |
| 11 | 2.219 | 0.916 |
| 12 | 1.317 | 1.780 |
| 13 | 1.800 | 1.326 |
| 14 | 1.573 | 0.701 |
| 15 | 0.720 | 0.432 |
| Comparative Example A | 0.364 | 0.145 |

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable antifouling composition comprising components:
    a) at least one fluorinated polymer, wherein each said at least one fluorinated polymer independently comprises:
        at least one divalent group A represented by the formula wherein $R^1$ independently represents H or methyl, X independently represents a covalent bond or a divalent organic linking group, $L^1$ independently represents a covalent bond or a divalent organic linking group, and $R_\mathit{fl}$ independently represents a monovalent perfluorinated organic group;
        at least one divalent group B represented by the formula wherein $L^2$ independently represents a covalent bond or divalent organic linking group, k represents an integer in the range of from 1 to 4, $R^2$ independently represents H or an alkyl group having from 1 to 18 carbon atoms, and f independently represents an integer in the range of from 3 to 200, inclusive;
        at least one divalent group C represented by the formula wherein $L^3$ independently represents a covalent bond or a divalent organic linking group, and each $Y^1$, $Y^2$, and $Y^3$ independently represents a hydrolyzable group or a hydrocarbyl group having from 1 to 10 carbon atoms, with the proviso that at least one of $Y^1$, $Y^2$, and $Y^3$ is a hydrolyzable group; and
    b) cationic curative.

2. A curable antifouling composition according to claim 1, wherein said cationic curative comprises a photoacid generator.

3. A curable antifouling composition according to claim 1, wherein the curable antifouling composition further comprises:
    c) an epoxysilane compound.

4. A curable antifouling composition according to claim 1, wherein the fluorinated polymer has an average molecular weight in a range of from 2000 grams/mole to 30,000 grams/mole.

5. A curable antifouling composition according to claim 1, wherein f is in a range of from 5 to 100.

6. A curable antifouling composition according to claim 1, wherein components a) and b) are present in a weight ratio of from 95:5 to 99.5:0.5.

7. A curable antifouling composition according to claim 1, wherein the weight ratio of said at least one group A to the sum of said at least one group B and said at least one C is in a range of from 60:40 to 5:95.

8. A curable antifouling composition according to claim 1, wherein the weight ratio of said at least one group B to said at least one group C is in a range of from 1:99 to 90:10.

9. An article comprising a substrate having a surface, wherein at least a portion of the surface has an antifouling coating thereon, wherein the substrate is selected from the group consisting of marine vessel hulls, anchors, piers, docks, caissons, invasive medical devices, non-invasive medical devices, handrails, door knobs, countertops, membrane support frames, heat exchangers, microelectrochemical drug delivery devices, papermaking machines, tanks for holding liquid, water pipes, plumbing fixtures, and mariculture apparatuses, wherein the antifouling coating comprises an at least partially cured curable antifouling composition, and wherein the curable antifouling composition comprises components:
    a) at least one fluorinated polymer, wherein each said at least one fluorinated polymer independently comprises:
        at least one divalent group A represented by the formula wherein $R^1$ independently represents H or methyl, X independently represents a covalent bond or a divalent organic linking group, $L^1$ independently represents a covalent bond or a divalent organic linking group, and $R_\mathit{fl}$ independently represents a monovalent perfluorinated organic group;
        at least one divalent group B represented by the formula wherein $L^2$ independently represents a covalent bond or divalent organic linking group, k represents an integer in the range of from 1 to 4, $R^2$ independently represents H of an alkyl group having from 1 to 18 carbon atoms, and f independently represents an integer in the range of from 3 to 200, inclusive;

at least one divalent group C represented by the formula wherein $L^3$ independently represents a covalent bond or a divalent organic linking group, and wherein each $Y^1$, $Y^2$, and $Y^3$ independently represents a hydrolyzable group or an alkyl group having from 1 to 7 carbon atoms, with the proviso that at least one of $Y^1$, $Y^2$, and $Y^3$ is a hydrolyzable group; and b) cationic curative.

10. An article according to claim 9, wherein said cationic curative comprises a photoacid generator.

11. An article according to claim 9, wherein f is in a range of from 5 to 68.

12. An article according to claim 9, wherein the curable antifouling composition further comprises:

c) an epoxysilane compound.

13. An article according to claim 9, wherein the weight ratio of said at least one group A to the sum of said at least one group B and said at least one C is in a range of from 60:40 to 5:95.

14. An article according to claim 9, wherein the weight ratio of said at least one group B to said at least one group C is in a range of from 1:99 to 90:10.

15. An article according to claim 9, wherein the substrate is a water pipe, and wherein the surface is an inner surface.

* * * * *

UNITED STATES PATENT AND TRADEMARK OFFICE
CERTIFICATE OF CORRECTION

Page 1 of 3

PATENT NO. : 10,947,396 B2
APPLICATION NO. : 14/442340
DATED : March 16, 2021
INVENTOR(S) : Qiu et al.

It is certified that error appears in the above-identified patent and that said Letters Patent is hereby corrected as shown below:

In the Specification

Column 5
Line 63, Delete "and or" and insert -- and/or --, therefor.

Column 6
Line 9, Delete "and or" and insert -- and/or --, therefor.

Column 6
Line 24, Delete "nonfluorobutyl," and insert -- nonafluorobutyl, --, therefor.

Column 6
Line 26, Delete "(polyethylenoxy)" and insert -- (polyethyleneoxy) --, therefor.

Column 6
Line 27, Delete "(polypropylenoxy)" and insert -- (polypropyleneoxy) --, therefor.

Column 6
Lines 27-28, Delete "(polymethylenoxy)" and insert -- (polymethyleneoxy) --, therefor.

Column 6
Line 28, Delete "(polybutylenoxy)" and insert -- (polybutyleneoxy) --, therefor.

Column 6
Line 35, Delete "Re" and insert -- $R_f^4$ --, therefor.

Column 6
Line 45, Delete "—CF2—," and insert -- —CF$_2$—, --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*

Column 6
Line 47, Delete "Re" and insert -- $R_f^4$ --, therefor.

Column 6
Line 53, Delete "[CF$_2$CF$_2$O]$_r$—;" and insert -- —[CF$_2$CF$_2$O]$_r$—; --, therefor.

Column 7
Line 10, Delete "and or" and insert -- and/or --, therefor.

Column 7
Line 22, Delete "and or" and insert -- and/or --, therefor.

Column 8
Line 34, Delete "(CF$_2$CF$_2$O)$_1$" and insert -- (CF$_2$CF$_2$O)$_l$ --, therefor.

Column 8
Line 35, Delete "(CF$_2$CF$_2$CF$_2$O)$_1$" and insert -- (CF$_2$CF$_2$CF$_2$O)$_l$ --, therefor.

Column 8
Lines 35-36, Delete "F(CF(CF$_3$)CF$_2$O)l" and insert -- F(CF(CF$_3$)CF$_2$O)$_l$ --, therefor.

Column 8
Line 45, Delete "(CF$_2$CF$_2$O)$_1$" and insert -- (CF$_2$CF$_2$O)$_l$ --, therefor.

Column 11
Line 9, Delete "and or" and insert -- and/or --, therefor.

Column 13
Line 4, Delete "Micrococaceae," and insert -- Micrococcaceae, --, therefor.

Column 13
Line 20, Delete "pnuemoniae;" and insert -- pneumoniae; --, therefor.

Column 13
Line 20, Delete "mirabilus" and insert -- mirabilis --, therefor.

Column 14
Line 26, Delete "perflourinated" and insert -- perfluorinated --, therefor.

Column 15
Line 14, After "one" insert -- group --.

Column 15
Line 51, Delete "perflourinated" and insert -- perfluorinated --, therefor.

CERTIFICATE OF CORRECTION (continued)
U.S. Pat. No. 10,947,396 B2

Column 16
Line 57, Delete "perflourinated" and insert -- perfluorinated --, therefor.

Column 17
Line 34, After "one" insert -- group --.

Column 18
Line 35, Delete "51." and insert -- S1. --, therefor.

Column 19
Line 10, Delete "m/min)" and insert -- m/min). --, therefor.

In the Claims

Column 22
Line 17, Claim 7, before "C" insert -- group --.

Column 23
Line 25, Claim 13, before "C" insert -- group --.